US011248536B2

(12) United States Patent
Minto et al.

(10) Patent No.: US 11,248,536 B2
(45) Date of Patent: Feb. 15, 2022

(54) SYSTEMS AND METHODS FOR FLAME HOLDING AVOIDANCE IN GAS TURBINE COMBUSTORS

(71) Applicant: General Electric Company, Schenectady, NY (US)

(72) Inventors: Karl Dean Minto, Greevnille, SC (US); Douglas Frank Beadie, Greer, SC (US); Ilya Aleksandrovich Slobodyanskiy, Greenville, SC (US)

(73) Assignee: General Electric Company, Schenectady, NY (US)

( * ) Notice: Subject to any disclaimer, the term of this patent is extended or adjusted under 35 U.S.C. 154(b) by 371 days.

(21) Appl. No.: 15/187,435

(22) Filed: Jun. 20, 2016

(65) Prior Publication Data

US 2017/0363015 A1 Dec. 21, 2017

(51) Int. Cl.
*F02C 9/26* (2006.01)
*F23R 3/18* (2006.01)
(Continued)

(52) U.S. Cl.
CPC ............. *F02C 9/26* (2013.01); *F01D 15/10* (2013.01); *F02C 3/30* (2013.01); *F23N 1/00* (2013.01);
(Continued)

(58) Field of Classification Search
CPC .. F05D 2270/71; F05D 2270/16; F02C 3/305; F02C 3/30; F02C 9/28; F02C 6/18; F02C 7/224; F01K 23/10; Y02E 20/16
See application file for complete search history.

(56) References Cited

U.S. PATENT DOCUMENTS 5,826,430 A * 10/1998 Little .................... F01K 23/10
60/736
7,337,057 B2    2/2008 Norman et al.
(Continued)

FOREIGN PATENT DOCUMENTS

EP           1 662 116 A1    5/2006
EP           20 107227       7/2009
(Continued)

OTHER PUBLICATIONS

Beadie et al., System and method for providing highly reactive fuels to a combustor, GE U.S. Appl. No. 62/195,918, filed Jul. 23, 2015.
(Continued)

*Primary Examiner* — Gerald L Sung
*Assistant Examiner* — Jacek Lisowski
(74) *Attorney, Agent, or Firm* — Fletcher Yoder, P.C.

(57) ABSTRACT

In an embodiment, a system includes a gas turbine controller. The gas turbine controller is configured to receive a plurality of sensor signals from a fuel composition sensor, a pressure sensor, a temperature sensor, a flow sensor, or a combination thereof, included in a gas turbine engine system. The controller is further configured to execute a gas turbine model by applying the plurality of sensor signals as input to derive a plurality of estimated gas turbine engine parameters. The controller is also configured to execute a flame holding model by applying the plurality of sensor signals and the plurality of estimated gas turbine engine parameters as input to derive a steam flow to fuel flow ratio that minimizes or eliminates flame holding in a fuel nozzle of the gas turbine engine system.

20 Claims, 5 Drawing Sheets

(51) Int. Cl.
*F01D 15/10* (2006.01)
*F23R 3/36* (2006.01)
*F02C 3/30* (2006.01)
*F23N 5/24* (2006.01)
*F23N 1/00* (2006.01)
*F23N 5/18* (2006.01)

(52) U.S. Cl.
CPC .............. *F23N 1/002* (2013.01); *F23N 5/24* (2013.01); *F23N 5/242* (2013.01); *F23R 3/18* (2013.01); *F23R 3/36* (2013.01); *F05D 2270/05* (2013.01); *F05D 2270/16* (2013.01); *F05D 2270/303* (2013.01); *F05D 2270/3011* (2013.01); *F05D 2270/3061* (2013.01); *F05D 2270/44* (2013.01); *F05D 2270/71* (2013.01); *F23K 2400/201* (2020.05); *F23K 2900/05004* (2013.01); *F23N 2005/185* (2013.01); *F23N 2225/04* (2020.01); *F23N 2225/26* (2020.01); *F23N 2231/28* (2020.01); *F23N 2237/22* (2020.01); *F23N 2239/04* (2020.01)

(56) References Cited

U.S. PATENT DOCUMENTS

| | | | |
|---|---|---|---|
| 7,895,821 B2 | 3/2011 | Annigeri et al. | |
| 8,042,340 B2 | 10/2011 | Ma et al. | |
| 8,469,588 B2 | 6/2013 | Chillar et al. | |
| 8,627,668 B2 | 1/2014 | Thompson | |
| 8,875,483 B2* | 11/2014 | Wettstein | F02C 7/18 60/39.52 |
| 9,046,266 B2 | 6/2015 | Chou et al. | |
| 2008/0115483 A1* | 5/2008 | Moore | C10J 3/00 60/39.461 |
| 2011/0072826 A1 | 3/2011 | Narra et al. | |
| 2011/0283706 A1* | 11/2011 | Rancruel | F02C 6/18 60/736 |
| 2013/0074508 A1* | 3/2013 | Sholes | F02C 6/003 60/772 |
| 2013/0074515 A1* | 3/2013 | Widener | F02C 9/40 60/780 |
| 2013/0219896 A1* | 8/2013 | Kraemer | F23L 7/002 60/737 |
| 2014/0116023 A1* | 5/2014 | Anand | F02C 3/30 60/39.52 |
| 2016/0169154 A1* | 6/2016 | Rao | F01K 13/02 701/100 |
| 2016/0245126 A1* | 8/2016 | Gerber | F02C 6/18 |

FOREIGN PATENT DOCUMENTS

| | | |
|---|---|---|
| EP | 2631540 | 8/2013 |
| EP | 2 831 385 A2 | 2/2015 |
| EP | 2401554 B1 | 5/2016 |
| EP | 2831385 B1 | 11/2016 |
| EP | 2390481 B1 | 12/2017 |
| WO | 2013144006 A2 | 10/2013 |
| WO | 2013144006 A3 | 10/2013 |
| WO | 2015/069137 A1 | 5/2015 |

OTHER PUBLICATIONS

Extended European Search Report issued in connection with corresponding EP Application No. 17176571.2 dated Apr. 20, 2018.

European Partial Search Report for EP17176571 dated Dec. 5, 2017, 15 pages.

* cited by examiner

SYSTEMS AND METHODS FOR FLAME HOLDING AVOIDANCE IN GAS TURBINE COMBUSTORS

BACKGROUND

The subject matter disclosed herein relates to combustion in gas turbines, and more specifically, to flame holding avoidance in gas turbine combustors.

A gas turbine system may include an inlet section, a compressor section, a combustion section, a turbine section and an exhaust section. The inlet section cleans and conditions a working fluid (e.g., air) and supplies the working fluid to the compressor section. The compressor section progressively increases the pressure of the working fluid and supplies a compressed working fluid to the combustion section. The compressed working fluid and a fuel such as natural gas is mixed within the combustion section and burned in a combustion chamber to release heat. A flame develops in a combustion zone having a combustible mixture of fuel and air. Unfortunately, the flame can potentially propagate upstream from the combustion zone into close proximity of the fuel nozzles, where the fuel and air are premixed prior to ignition, which may be undesired. Likewise, the flame can sometimes develop on or near surfaces, which can also result in undesired combustion. This phenomenon is generally referred to as flame holding. As flame holding generally results in undesired effects, it is advantageous to improve systems and methods of combustion in order to avoid or prevent the occurrence of flame holding.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine controller. The gas turbine controller is configured to receive a plurality of sensor signals from a fuel composition sensor, a pressure sensor, a temperature sensor, a flow sensor, or a combination thereof, disposed in a fuel conduit included in a gas turbine engine system. The gas turbine controller is further configured to execute a gas turbine model by applying the plurality of sensor signals as input to derive a plurality of estimated gas turbine engine parameters. The gas turbine controller is also configured to execute a flame holding model by applying the plurality of sensor signals and the plurality of estimated gas turbine engine parameters as input to derive a steam flow to fuel flow ratio that minimizes or eliminates flame holding in a fuel nozzle of the gas turbine engine system. The gas turbine controller is additionally configured to control delivery of a steam, a fuel, or a combination thereof, based on the steam flow to fuel flow ratio.

In a second embodiment, a method includes receiving a plurality of sensor signals from a fuel composition sensor, a pressure sensor, a temperature sensor, a flow sensor, or a combination thereof, disposed in a fuel conduit included in a gas turbine engine system. The method additionally includes executing a gas turbine model by applying the plurality of sensor signals as input to derive a plurality of estimated gas turbine engine parameters. The method also includes executing a flame holding model by applying the plurality of sensor signals and the plurality of estimated gas turbine engine parameters as input to derive a steam flow to fuel flow ratio that minimizes or eliminates flame holding in a fuel nozzle of the gas turbine engine system. The method further includes controlling delivery of a steam, a fuel, or a combination thereof, based on the steam flow to fuel flow ratio.

In a third embodiment, a tangible, non-transitory, computer-readable medium includes instructions that when executed by a processor cause the processor to receive a plurality of sensor signals from a fuel composition sensor, a pressure sensor, a temperature sensor, a flow sensor, or a combination thereof, disposed in a fuel conduit included in a gas turbine engine system. The instructions also cause the processor to execute a gas turbine model by applying the plurality of sensor signals as input to derive a plurality of estimated gas turbine engine parameters. The instructions further cause the processor to execute a flame holding model by applying the plurality of sensor signals and the plurality of estimated gas turbine engine parameters as input to derive a steam flow to fuel flow ratio that minimizes or eliminates flame holding in a fuel nozzle of the gas turbine engine system. The instructions additionally cause the processor to control delivery of a steam, a fuel, or a combination thereof, based on the steam flow to fuel flow ratio.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
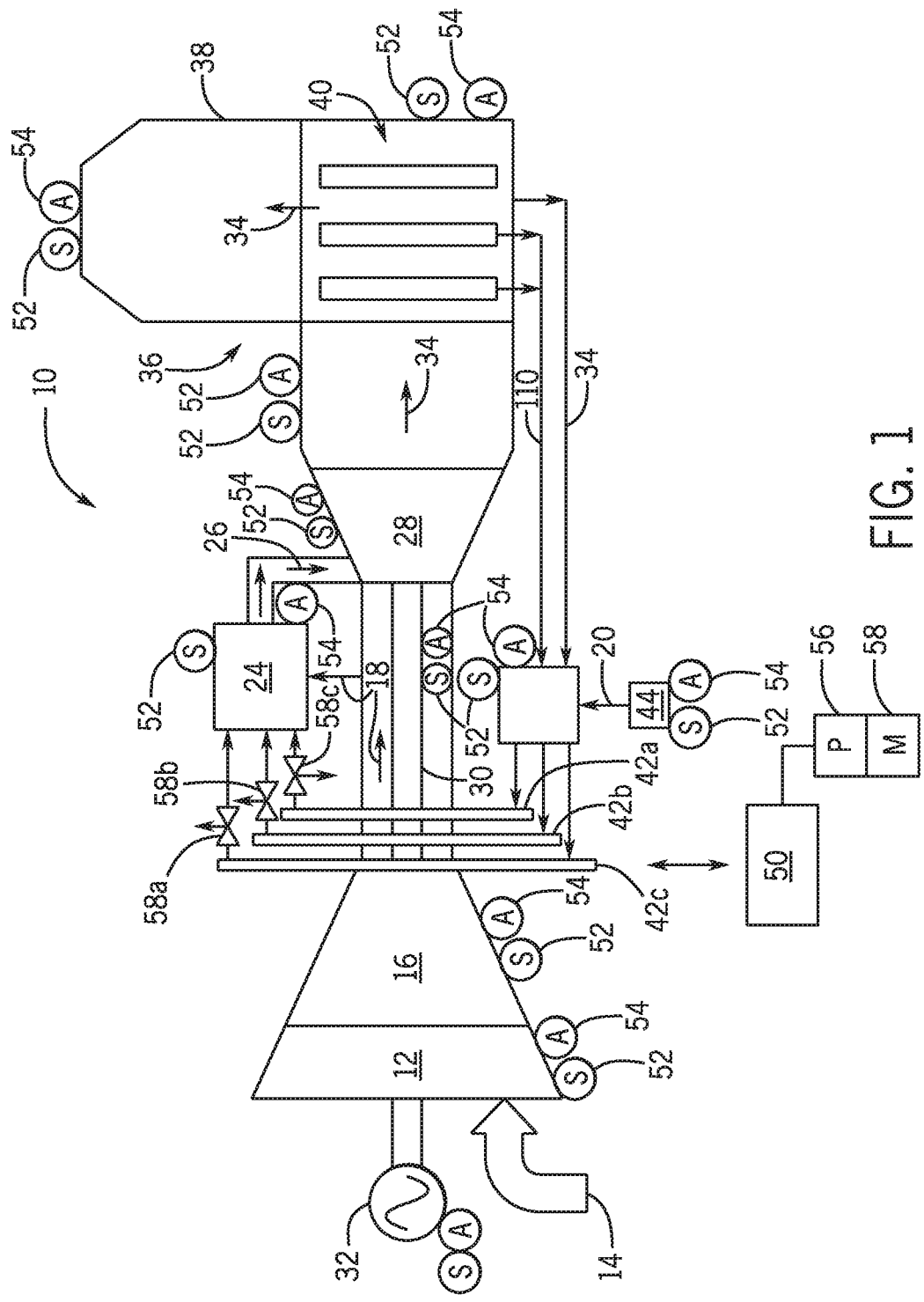
FIG. 1 is a diagram of an embodiment of a gas turbine system including a flame holding avoidance control system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Due to the continuous surge in natural gas demand, a supply of pipeline natural gas may, on occasion, become unable to satisfy the demand for natural gas fuel. As a result, gas turbine operators are constantly looking for suitable alternate fuels to burn within their gas turbines in place of the natural gas until the natural gas supply is restored. One example of a potential alternate fuel is ethane which is a known highly reactive fuel (HRF). With the introduction of hydraulic fracturing as a means to extract natural gas, a large surplus of ethane has materialized throughout the world.

There may be various technical challenges associated with substituting one fuel such as ethane or other HRF for fuels traditionally used in a gas turbine combustor, particularly in combustors that are highly tuned over a narrow range of operating conditions based on the various fuel properties (i.e. fuel density, reactivity and Wobbe Number) of natural gas fuel. Highly reactive fuels (HRFs) such as ethane typically have a higher Wobbe Number (described below), than natural gas. HRFs may be diluted with an inert such as nitrogen to reduce the Wobbe Number to that of the pipeline natural gas. However, this process increases time and costs and may thus lower the competitiveness of using an HRF as a substitute fuel. The incoming gas Wobbe Number (WN) and the Modified Wobbe Index (MWI) of the gas supplied to the turbine are particularly useful fuel properties.

The WN is defined as:

$$WN = \frac{HHV}{\sqrt{SG}}$$

Where HHV is the higher heating value of the gas fuel; and SG is the specific gravity of the gas fuel or gas fuel and steam mixture relative to air. The WN is used as an interchangeability index to permit gas fuels of various heating values to be utilized in the same combustion system without changing hardware. Temperature is not included in this equation for WN because gas is typically delivered at approximately ground temperature with little variation throughout the year. MWI may be derived using a gas temperature $T_g$ and a specific gravity (SGx) at $T_g$.

$$MWI = \frac{LHV}{\sqrt{(SGx(460 + T_g))}}$$

LHV is the lower heating value of the gas fuel or gas fuel and steam mixture and Tg is the gas fuel or gas fuel and steam mixture temperature in degrees Fahrenheit. MWI more accurately measures the energy delivered through a fuel nozzle at a given pressure ratio than WN. This distinction between MWI and WN becomes more important when gas fuel is heated before delivery to the gas turbine. Therefore, there is a need for a system and method for reducing the HHV of an alternate HRF such as ethane. It is well known that the presence of certain components within a gas fuel, such as ethane, may increase the possibility of flame holding. The system and method should minimize or eliminate flame holding when operating, for example, on fuels with a high concentration of ethane. In certain embodiments, a control system may apply model based control (MBC) to utilize fuels with an inherently high concentration of ethane, but to compensate for this condition by the addition of a controlled injection of an inert component, such as with steam. The controller may observe a variety of gas turbine system parameters, including fuel composition, speed, pressures, flows, mass flows, clearances (e.g., distance between a stationary and a moving component), and the like, and apply MBC, for example, to maintain a Damkohler margin, as described in more detail below. By injecting steam to mix with fuels containing a high concentration of ethane, as described herein, the control system may enable the more efficient utilization of such fuels while minimizing or eliminating the risk of flame holding.

Turning now to FIG. 1, the figure illustrates a diagram of an embodiment of a power plant site comprising a gas turbine system 10 that may incorporate various embodiments of the present invention. The gas turbine system 10 may, in some embodiments, be a dry low NOx (DLN) gas turbine system suitable for dry low NOx combustion and thus minimizing, for example, NOx emissions. As shown, the gas turbine system 10 generally includes an inlet section 12 that may include a series of filters, cooling coils, moisture separators, and/or other devices to purify and otherwise condition air 14 or other working fluid entering the gas turbine system 10. The air 14 flows to a compressor section where a compressor 16 progressively imparts kinetic energy to the air 14 to produce compressed air 18.

The compressed air 18 is mixed with a fuel 20 such as natural gas from a fuel supply system 22 to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (HRSG) system 40 for cleaning and extracting additional heat from the exhaust gases 34 prior to release to the environment. For example, the HRSG 40 may include various heat exchangers in thermal communication with the exhaust gases which generate superheated steam. The superheated steam may then be routed to various components at the power plant site such as to one or more steam turbines (not shown).

As shown in FIG. 1, the fuel supply system may include various fuel distribution manifolds or rings 42(a), 42(b) & 42(c) that are each adapted to receive the fuel from the fuel supply system 22 and to distribute the fuel to various fuel circuits (not shown) defined within each combustor 24. The various fuel circuits may allow for greater fuel control flexibility to one or more fuel nozzles positioned within the combustors. For example, fuel distribution manifold 42(a) may provide a portion of fuel 20 to a first premix circuit or PM1 within the combustor while fuel distribution manifolds 42(b) and 42(c) may provide fuel to second and third premix manifolds or PM2 and PM3 respectfully. A fuel source 44 may provide the fuel 20 to the fuel supply system 22. In some embodiments, the fuel source 44 may include storage tanks, pipeline systems, and so on. The fuel 22 may include a primary fuel such as natural gas, but also a highly reactive fuel (HRF), such as ethane, or mixtures of ethane and natural gas.

Also illustrated in FIG. 1 is a control system 50 suitable for controlling operations of the gas turbine system 10 and related components. For example, the control system 50 may receive sensor signals from a plurality of sensors 52 disposed in the various components of the gas turbine system 10 and derive certain control actions that may then actuate a plurality of actuators 54 to control the various components (e.g., 12, 16, 22, 24, 28, 30, 32, 36, 38, 40, 42, 58a, 58b, 58c, and the like) of the gas turbine engine system 10. The sensors 52 may include fuel composition sensors, pressure sensors, temperature sensors, flow sensors, clearance sensors (e.g., sensing distances between moving and stationary components), and the like. The actuators 54 may include valves, pumps, positioners, and the like, suitable for actuation based on certain control actions. The control system 50 further includes one or more processors 56 and a memory 58. The processor(s) 56 may execute computer code or instructions that may be stored in the memory 58.

Figure 2:
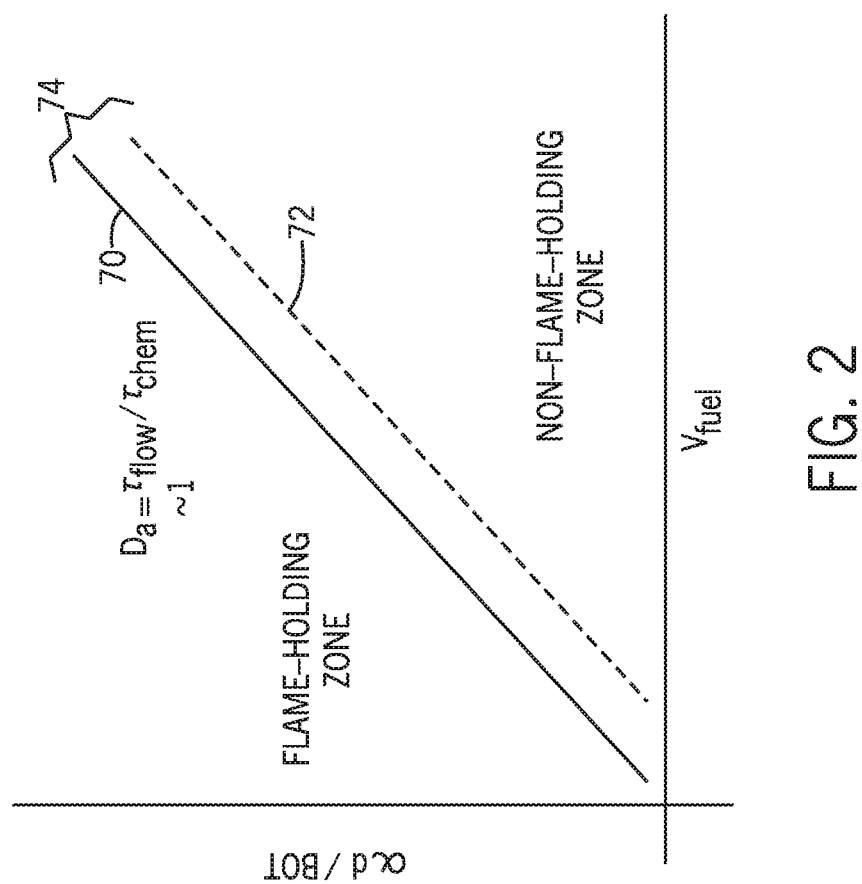
FIG. 2 is an embodiment of a graph representative of a flame holding model having a flame holding boundary.

As illustrated in FIG. 2, the control system 50 may be programmed to respect a certain boundary during operations, such as an example flame holding boundary 70. More specifically, the figure depicts the flame holding boundary 70 as being derived based on an equation:

$$D_a = \frac{\tau_{flow}}{\tau_{Chem}} \sim 1 \qquad \text{Equation (1)}$$

where $\tau_{flow}$ may represent flow time scale and $\tau_{chem}$ may represent a chemical time scale, which are terms used in computational fluid dynamics and the study of combustion. $D_a$ may also be expressed as reaction rate d divided by a convective mass transport rate, or characteristic fluid time divided by characteristic chemical reaction time. However it is derived, $D_a$ is generally regarded as representing a dimensionless reaction time for a flow regime, and in embodiments, if a value of Da is maintained less than 1 for a particular air-fuel mixture flow regime, then combustion and flame holding are very unlikely to occur. Points at which Da is equal to one may therefore be regarded as belonging to the flame holding boundary 70.

In the depicted embodiment, a flame holding operating limit 72 may be derived, for example, by the control system 50, and used to operate near the flame holding boundary 70. A margin 74 may be applied to create a distance between the flame holding boundary 70 and the flame holding operating limit 72. For example, the margin 74 may be a percent margin, such as a percent margin between 0.1 and 10% from the flame holding boundary 70. Accordingly, the control system 50 may operate substantially along the flame holding operating limit 72 with the margin 74 providing for situations where the flame holding operating limit 72 may be inadvertently exceeded.

Figure 3:
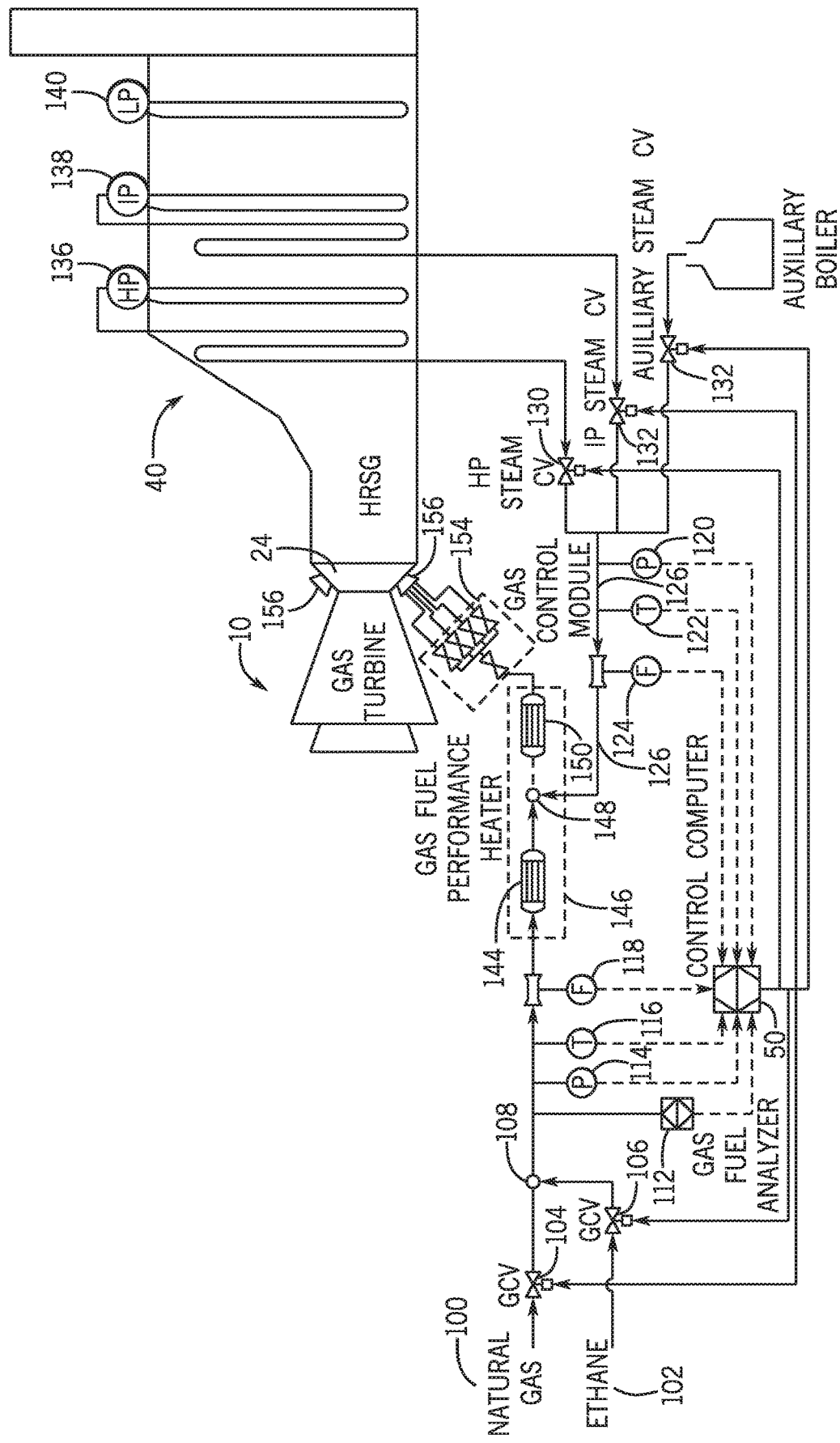
FIG. 3 illustrates details of an embodiment of the flame holding avoidance control system operatively coupled to certain components of the gas turbine system of FIG. 1.

FIG. 3 illustrates details of an embodiment of the control system 50 operatively coupled to certain components of the gas turbine system 10, and used, for example, to combust ethane fuel while minimizing or eliminating flame holding. In the depicted embodiment, the fuel supply 22 (shown in FIG. 1) is delivering a natural gas 100 and an ethane 102. The control system 50 is shown as operatively coupled to valves 104 and 106 respectively, such as gas control valves. Valve 104 may be used to deliver the natural gas 100 while valve 106 may be used to deliver the ethane 102. In the depicted embodiment, the natural gas 100 and the ethane 102 may be mixed in a chamber 108. It is to be understood that in other embodiments, the natural gas 100 and the ethane 102 may be delivered by the fuel supply 22 (shown in FIG. 1) in premixed form. It is also to be understood that other carbonaceous fuels may be used in addition to or in lieu of the natural gas 100 and/or the ethane 102. Indeed, the techniques described herein may suitable use a variety of HRFs in addition to or alternative to ethane 102, for example. It is also to be noted that implicit in the system that supplies fuels, be it natural gas or ethane or others, the fuels are at a sufficiently high pressure to be used by the gas turbine system. Such systems as may be used to elevate the pressure of the fuel system supply are not depicted here.

As a natural gas-ethane mix fluidly traversed through a conduit 109 a series of sensors may be used to deliver certain measurements to the control system 50. For example, a gas fuel analyzer 112 (e.g., gas chromatograph, fuel analyzer system, and the like) may sense a composition of the natural gas-ethane mix, such as concentration measures of the natural gas 100 and/or the ethane 102, as well as a variety of other measures including fuel properties (e.g., flash point, specific gravity, viscosity, water content, and so on). In the depicted embodiment, a pressure sensor 114, temperature sensor 116, and a flow sensor 118 are also shown. The gas fuel analyzer 112, the pressure sensor 114, the temperature sensor 116, and the flow sensor 118 are communicatively coupled to the control system 50. Also shown are a pressure sensor 120, temperature sensor 122, and a flow sensor 124 disposed in a conduit 126 and communicatively coupled to the control system 50. The conduit 126 may receive fluid (e.g., steam) incoming from the HRSG 40 and/or an auxiliary boiler 128. More specifically, the control system 50 may modulate valves 130, 132, and 134 to deliver a high pressure steam 136 from the HRSG 40, an intermediate pressure steam 138 from the HRSG 40, and/or an auxiliary steam 142 from the auxiliary boiler 128.

In operation, the control system 50 may thus receive signals from the gas fuel analyzer 112, the pressure sensor 114, the temperature sensor 116, and/or the flow sensor 118 to determine certain properties of the natural gas-ethane mix (e.g., ethane concentration, fluid temperature, fluid pressure, fluid flow rate) and then use a model based control (MBC) as described in more detail below. The control system 50 may then inject steam (e.g., high pressure steam 136, intermediate pressure steam 138, and/or auxiliary steam 142) through the valves 130, 132, 134, for example. Accordingly, the ethane laden fuel mix may be provided to a first heat exchanger 144 of a gas fuel performance heater system 146. The first heat exchanger 144 may preheat the ethane-fuel mix, for example, to ensure that no condensate is present in the ethane-fuel mix.

The control system 50 may then deliver steam, such as the high pressure steam 136, the intermediate pressure steam 138, and/or the auxiliary pressure steam 142, to a mixing chamber 148. In the depicted embodiment, the mixing chamber 148 is immediately downstream from the heat exchanger 144 and immediately upstream from a heat exchanger 150. The control system 50 may use sensor signals from the pressure sensor 120, temperature sensor 122, and/or flow sensor 124, to modulate the valves 130, 132, and/or 134 to deliver the high pressure steam 136, the intermediate pressure steam 138, and/or the auxiliary pressure steam 142, to a mixing chamber 148. As described in further detail below, model-based control may be used to arrive at a quantity of the high pressure steam 136, the intermediate pressure steam 138, and/or the auxiliary pressure steam 142, to deliver to mixing chamber 148.

Steam mixed with the ethane laden fuel mix may alter the concentration of, for example, the ethane, as well as the chemical makeup of the fuel. The steam may act as a diluent, for example, reducing reactivity of the fuel. The fuel may then enter a second heat exchanger 150, for example, to further heat the fuel and/or remove liquids from the fuel. The second heat exchanger, in the depicted embodiment, may be disposed immediately upstream from a gas control module 154 that may be suitable for injecting the fuel mix (e.g., ethane-steam-fuel mix) exiting the second heat exchanger 150 and deliver the fuel mix into one or more fuel nozzles 156. The fuel may then be combusted and converted to rotative motion as describe above.

Advantageously, the techniques describe herein may apply Damkohler model-based control via valves 104, 106, 130, 132, 134, to minimize or eliminate flame holding, for example, in the nozzle(s) 156. Indeed, steam from the HRSG 40 may be used, as opposed to steam or other diluents (e.g., CO2) from systems external to the power production system 10, for increased reusability and efficiency. The auxiliary boiler 128 may provide for a steam source suitable for use when the HRSG 40 is starting up. That is, as the power production system 10 begins operations, the HRSG 40 may not include sufficient steam 136 and/or 138 and the steam useful for moderating the ethane 102 may be provided by the auxiliary boiler 128. Once the HRSG 40 is in operation producing steam, then the high pressure steam 136 and/or intermediate pressure steam 138 may be used.

Figure 4:
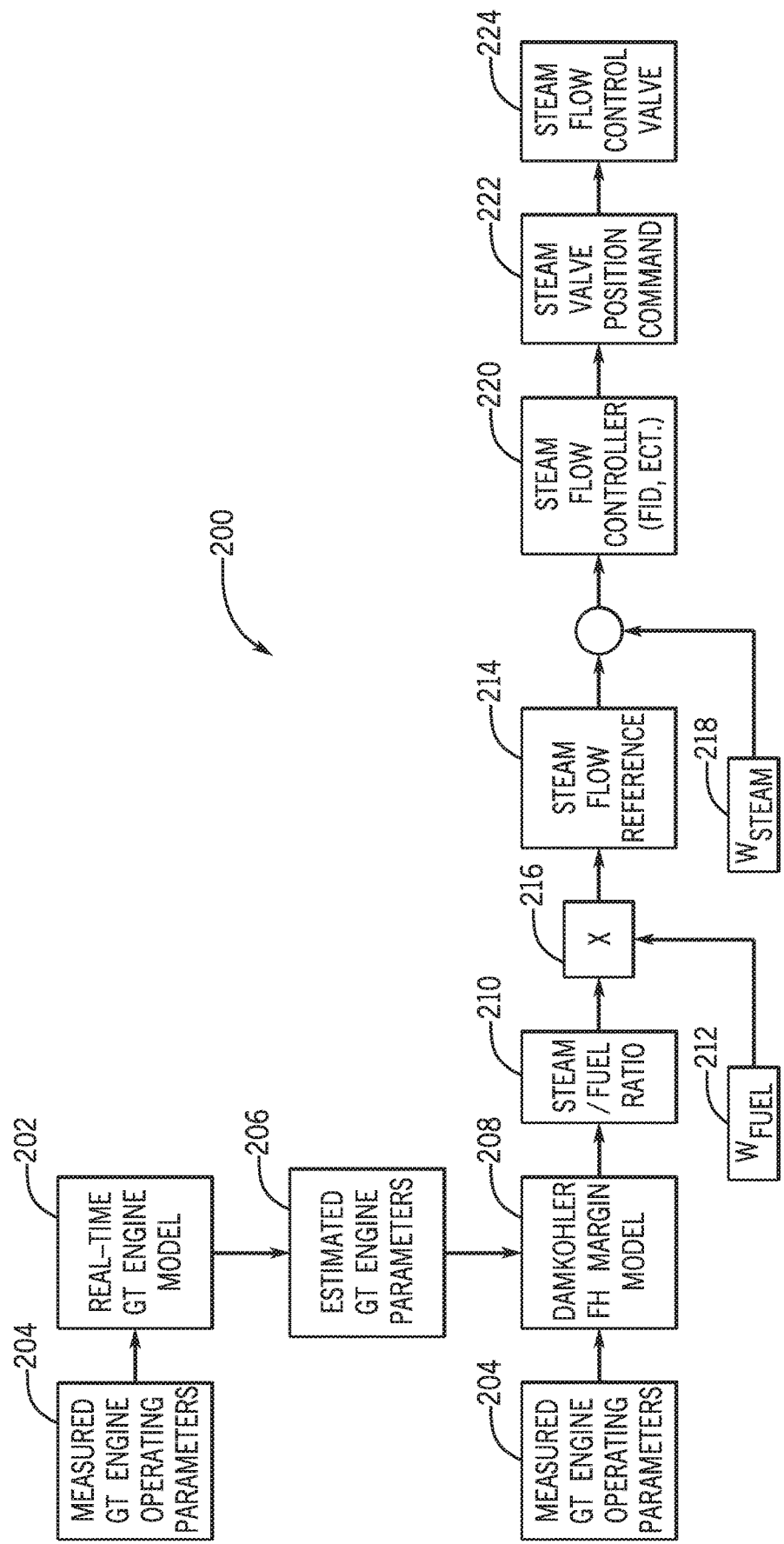
FIG. 4 is an embodiment of a function block diagram illustrating a model-based flame holding avoidance process implementable as a control algorithm.

FIG. 4 illustrates an example control process 200 that may be suitable for minimizing or eliminating flame holding while combusting ethane-laden fuel, for example, in the power production system 10 shown in FIG. 1. The process 200 may be implemented as computer executable code or instructions executed by the processor 56 and stored in the memory 58. In the depicted embodiment, a gas turbine model 202 may receive a plurality of measured gas turbine operating parameters 204 as input. The measured gas turbine operating parameters 204 may include the signals received via the gas fuel analyzer 112, the pressure sensor 114, the temperature sensor 116, and/or the flow sensor 118, as well as speed of the system 10, exhaust measures (e.g., pressures, temperatures, flows), HRSG measures (e.g., temperatures, pressures, flows), and so on.

The gas turbine model 202 may process the measured gas turbine operating parameters 204 in real-time to generate a plurality of estimated gas turbine parameters 206. More specifically, the gas turbine model 202 may include physics-based models, such as thermodynamic models, fluid models, low cycle fatigue (LCF) life prediction models, computational fluid dynamics (CFD) models, finite element analysis (FEA) models, solid models (e.g., parametric and non-parametric modeling), and/or 3-dimension to 2-dimension FEA mapping models. Model 202 may also include artificial intelligence (AI) models, such as expert systems (e.g. forward chained expert systems, backward chained expert systems), neural networks, fuzzy logic systems, state vector machines (SVMs), inductive reasoning systems, machine learning systems, Bayesian inference systems, or a combination thereof.

The gas turbine model 202 may be used to derive and/or predict the estimated gas turbine parameters 206 including but not limited to air flows, temperatures (e.g., flame temperatures in combustor, combustor temperatures, exhaust temperatures), pressures, speeds (e.g., rotative speeds), fluid flows, and/or clearances (e.g., distances between stationary and moving components) related to the power production system 10 and/or related to the system's components by using the measured gas turbine operating parameters 204 as input. The measured gas turbine operating parameters 204, and in particular, fuel composition measures (e.g., fuel composition, fuel flows, fuel pressure), may also be used as input into a Damkohler flame holding margin model 208.

The Damkohler flame holding margin model 208 may compute the flame holding boundary 70 and/or the flame holding operating limit 72, as described above with respect to FIG. 2, by using the measured gas turbine operating parameters 204, and in particular, fuel measures (e.g., fuel composition, fuel flows, fuel pressure). For example, the flame holding boundary 70 may be computed via Equation 1 above. In other embodiments, the flame holding boundary 70 may be pre-computed and stored, for example, in the memory 58. The flame holding operating limit 72 may be additionally computed in real-time or pre-computed via the margin 74.

The Damkohler flame holding margin model 208 may compute a desired steam flow to fuel flow ratio 210, based on the computed flame holding boundary 70 and/or the flame holding operating limit 72. Because a current fuel flow 212 may be known, for example via the flow sensor 118, a desired steam flow (e.g., steam flow reference) 214 may be computed at block 216. A measured current steam flow 218, derived, for example, by using steam flow sensor 124 signals, may then be used by the process 200. For example, the desired steam flow 214 and the current steam flow 218 may then be used by a control block 220 to issue steam valve positioning command(s) 222, with may then control or modulate (block 224) the valves 130, 132, 134. It is also to be noted that, in some case, the fuel flow may be adjusted by the process 200 via the valves 104, 106 to achieve the desired steam flow to fuel flow ratio 210. By executing the gas turbine model 202 and the Damkohler flame holding margin model 208, the process 200 may derive a more efficient steam flow/fuel flow ratio 210, and adjust any one or more of the valves 104, 106, 130, 132, 134.

Figure 5:
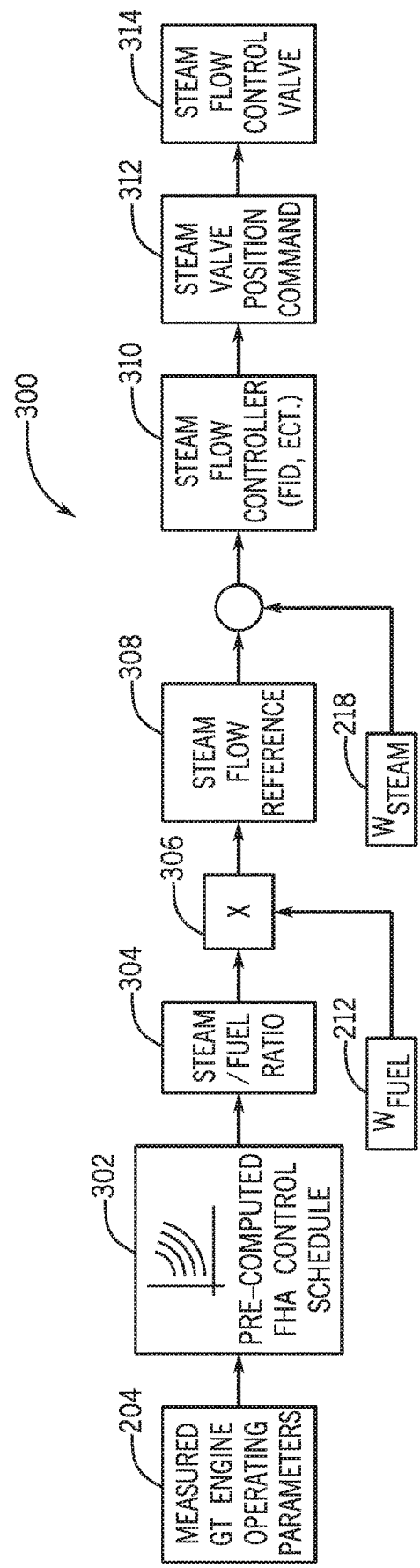
FIG. 5 is an embodiment of a function block diagram illustrating a pre-computed model-based flame holding avoidance process implementable as a control algorithm.

In some cases, it may be desirable to pre-compute certain control schedules to improve speed and memory consumption, for example, of the process 200. Accordingly, FIG. 5. Depicts an embodiment of a process 300 that includes pre-computed control schedules 302. The process 300 may be implemented as computer executable code or instructions executed by the processor 56 and stored in the memory 58. In the depicted embodiment, the pre-computed control schedules 302 may include lookup tables, pre-computed graphs, pre-computed ranges, and so on, that enable the process 300 to more quickly derive a desired steam flow to fuel flow ratio 304.

In one example, the pre-computed control schedules 302 may derived by executing the gas turbine model 202 and the Damkohler flame holding margin model 208 over a series of data points (e.g., logged data) to produce the lookup tables, pre-computed graphs, pre-computed ranges, or a combination thereof. During operations, the process 300 may apply the measured gas turbine operating parameters 204 as input to the pre-computed control schedules 302, including but not limited to the signals received via the gas fuel analyzer 112, the pressure sensors 114, the temperature sensor 116, and/or the flow sensor 118, as well as speed of the system 10, exhaust measures (e.g., pressures, temperatures, flows), HRSG measures (e.g., temperatures, pressures, flows), and so on.

The process 300 may then use the pre-computed control schedules 302 to derive the desired steam flow to fuel flow ratio 304. The process 300 may then use the measured current fuel flow 212 in block 306 to compare with the desired steam flow to fuel flow ratio 304 in order to derive a desired steam flow (e.g., steam flow reference) 308. The measured current steam flow 218, derived, for example, by using steam flow sensor 124 signals, may then be used by the process 300. For example, the desired steam flow 308 and the current steam flow 218 may then be used by a control block 310 to issue steam valve positioning command(s) 312, which may then control or modulate (block 314) the valves 130, 132, 134. It is also to be noted that, in some cases, the fuel flow may be adjusted by the process 300 via the valves 104, 106 to achieve the desired steam flow to fuel flow ratio 304.

Technical effects of the invention include the ability to use higher level (e.g., between 20% to 100%) ethane concentrations in fuel mixes while applying model based control to eliminate flame holding, for example, in fuel nozzles of a gas turbine engine system. The model based control may include executing gas turbine model to derive a set of estimated gas turbine engine parameters. The model based control may also include executing a flame holding model to derive a desired steam flow to fuel flow ratio that minimizes or eliminates flame holding. The model based control may then modulate one or more valves to adjust fuel and/or steam control based on the desired steam flow to fuel flow ratio, thus substantially minimizing or eliminating flame holding in the gas turbine system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a gas turbine engine system;
a fuel conduit included in the gas turbine engine system;
a plurality of sensors disposed in the fuel conduit, said plurality of sensors comprising a fuel composition sensor, a pressure sensor, a temperature sensor, a flow sensor, or a combination thereof;
a gas turbine controller configured to:
receive one or more sensor signals from the plurality of sensors disposed in the fuel conduit included in the gas turbine engine system;
execute a gas turbine model by applying the one or more sensor signals as input to derive a plurality of estimated gas turbine engine parameters;
execute a flame holding model that comprises a flame holding boundary derived via a Damkohler equation by applying the one or more sensor signals and the plurality of estimated gas turbine engine parameters as input to derive a steam flow to fuel flow ratio that minimizes or eliminates flame holding in a fuel nozzle of the gas turbine engine system; and
control delivery of a steam from a heat recovery steam generator system (HRSG) and a fuel based on the steam flow to fuel flow ratio so that a flame holding operating limit for the gas turbine engine system operates the gas turbine engine system near the flame holding boundary and within a margin from the flame holding boundary, wherein the margin comprises a percent margin between 0.1% and 10% from the flame holding boundary;
the HRSG system fluidly coupled downstream from the gas turbine engine system and configured to receive an exhaust from the gas turbine engine system, and wherein the steam comprises a high pressure steam produced by the HRSG system, an intermediate steam produced by the HRSG system, or a combination thereof, wherein the gas turbine controller is configured to operatively couple to the gas turbine engine system and to the HRSG system when in use; and
a mixing chamber for mixing the steam and the fuel that is located immediately downstream from a first heat exchanger and immediately upstream of a second heat exchanger.

2. The system of claim 1, wherein the gas turbine controller is configured to execute the flame holding model to derive the flame holding operating limit for the gas turbine system so as to operate near the flame holding boundary and within the margin from the flame holding boundary based on the one or more sensor signals and the plurality of estimated gas turbine engine parameters.

3. The system of claim 2, wherein the flame holding boundary comprises a Damkohler flame holding boundary.

4. The system of claim 3, wherein the Damkohler flame holding boundary is derived via the Damkohler equation $$D_a = \frac{\tau_{flow}}{\tau_{Chem}} = 1$$

where $\tau_{flow}$ is representative of a flow time scale and $\tau_{chem}$ is representative of a chemical time scale.

5. The system of claim 1, comprising: an auxiliary boiler, wherein the steam comprises an auxiliary steam produced by the auxiliary boiler during startup operations of the HRSG system.

6. The system of claim 1, wherein the control delivery of the steam comprises deriving a current flow of the fuel via the flow sensor, and deriving a desired steam flow by using the steam flow to fuel flow ratio.

7. The system of claim 6, comprising: a second flow sensor and at least one valve disposed in a steam conduit fluidly coupled to a gas fuel performance heater, wherein the gas turbine controller is configured to control the at least one valve based on the desired steam flow.

8. The system of claim 7, comprising the gas fuel performance heater, wherein the gas fuel performance heater comprises the first heat exchanger fluidly coupled to the second heat exchanger, and wherein the steam conduit is fluidly coupled downstream of the first heat exchanger and upstream of the second heat exchanger.

9. The system of claim 1, wherein the gas turbine engine system comprises a first fuel distribution manifold providing a first portion of the fuel to a first premix circuit within a combustor, a second fuel distribution manifold providing a second portion of the fuel to a second premix circuit within the combustor, and a third fuel distribution manifold providing a third portion of the fuel to a third premix circuit within the combustor.

10. The system of claim 1, wherein the steam comprises the high pressure steam produced by the HRSG system.

11. The system of claim 1, wherein the steam comprises the intermediate pressure steam produced by the HRSG system.

12. A method, comprising:
receiving one or more sensor signals from a fuel composition sensor, a pressure sensor, a temperature sensor, a flow sensor, or a combination thereof, disposed in a fuel conduit included in a gas turbine engine system;
executing a gas turbine model by applying the one or more sensor signals as input to derive a plurality of estimated gas turbine engine parameters;
executing a flame holding model that comprises a flame holding boundary derived via a Damkohler equation by applying the one or more sensor signals and the plurality of estimated gas turbine engine parameters as input to derive a steam flow to fuel flow ratio that minimizes or eliminates flame holding in a fuel nozzle of the gas turbine engine system, wherein a steam flow comprises a high pressure steam produced by a heat recovery steam generator (HRSG) system, an intermediate steam produced by the HRSG system, or a combination thereof;
controlling, via a controller, delivery of a steam produced from the HRSG system based on the steam flow to fuel flow ratio so that a flame holding operating limit for the gas turbine engine system operates the gas turbine engine system near the flame holding boundary and within a margin from the flame holding boundary, wherein the controller is configured to operatively couple to the gas turbine engine system and to the HRSG system when in use, wherein the margin comprises a percent margin between 0.1% and 10% from the flame holding boundary; and
delivering the steam to a mixing chamber for mixing the steam with a fuel, the mixing chamber being located immediately downstream from a first heat exchanger and immediately upstream of a second heat exchanger.

13. The method of claim 12, comprising: delivering the fuel to the gas turbine engine system via a first fuel distribution manifold providing a first portion of the fuel to a first premix circuit within a combustor, a second fuel distribution manifold providing a second portion of the fuel to a second premix circuit within the combustor, and a third fuel distribution manifold providing a third portion of the fuel to a third premix circuit within the combustor.

14. The method of claim 12, wherein executing the flame holding model comprises deriving the flame holding operating limit for the gas turbine system so as to operate near the flame holding boundary and within the margin from the flame holding boundary based on the one or more of sensor signals and the plurality of estimated gas turbine engine parameters.

15. The method of claim 14, wherein the flame holding boundary comprises a Damkohler flame holding boundary.

16. The method of claim 12, wherein the controlling delivery of the steam comprises controlling delivery of an intermediate pressure steam, a high pressure steam, or a combination thereof, wherein the intermediate pressure steam, the high pressure steam, or the combination thereof is produced by the heat recovery steam generator (HRSG) system fluidly coupled downstream from the gas turbine engine system and configured to receive an exhaust from the gas turbine system.

17. A tangible, non-transitory, computer-readable medium comprising: instructions that when executed by a processor cause the processor to:
receive one or more sensor signals from a fuel composition sensor, a pressure sensor, a temperature sensor, a flow sensor, or a combination thereof, disposed in a fuel conduit included in a gas turbine engine system;
execute a gas turbine model by applying the one or more sensor signals as input to derive a plurality of estimated gas turbine engine parameters;
execute a flame holding model that comprises a flame holding boundary derived via a Damkohler equation by applying the one or more sensor signals and the plurality of estimated gas turbine engine parameters as input to derive a steam flow to fuel flow ratio that minimizes or eliminates flame holding in a fuel nozzle of the gas turbine engine system;
control, via a controller, delivery of a steam produced from a heat recovery steam generator (HRSG) system and a fuel based on the steam flow to fuel flow ratio so that a flame holding operating limit for the gas turbine engine system operates the gas turbine engine system near the flame holding boundary and within a margin from the flame holding boundary, wherein the margin comprises a percent margin between 0.1% and 10% from the flame holding boundary, wherein the control delivery of the steam comprises controlling delivery of an intermediate pressure steam, a high pressure steam, or a combination thereof, wherein the intermediate pressure steam, the high pressure steam, or the combination thereof is produced by the HRSG system fluidly coupled downstream from the gas turbine engine system and configured to receive an exhaust from the gas turbine engine system, wherein the controller is configured to operatively couple to the gas turbine engine system and to the HRSG system when in use; and
deliver the steam to a mixing chamber for mixing the steam with the fuel, the mixing chamber being located immediately downstream from a first heat exchanger and immediately upstream of a second heat exchanger.

18. The tangible, non-transitory, computer-readable medium of claim 17, comprising: the instructions that when executed by the processor cause the processor to deliver the fuel to the gas turbine engine system via a first fuel distribution manifold providing a first portion of the fuel to a first premix circuit within a combustor, a second fuel distribution manifold providing a second portion of the fuel to a second premix circuit within the combustor, and a third fuel distribution manifold providing a third portion of the fuel to a third premix circuit within the combustor.

19. The tangible, non-transitory, computer-readable medium of claim 17, wherein the instructions that when executed by the processor cause the processor to execute the flame holding model comprises instructions that when executed by the processor cause the processor to derive the flame holding operating limit for the gas turbine system so as to operate near the flame holding boundary and within the margin from the flame holding boundary based on the one or more sensor signals and the plurality of estimated gas turbine engine parameters.

20. The tangible, non-transitory, computer-readable medium of claim 19, wherein the flame holding boundary comprises a Damkohler flame holding boundary.

* * * * *